United States Patent Office 3,353,971
Patented Nov. 21, 1967

3,353,971
ETHYLCELLULOSE LATEX POLISH COMPOSITION
Albert B. Savage, Midland, and Julius C. Aldrich, Mount Pleasant, Mich., assignors to The Dow Chemical Company, Midland, Mich., a corporation of Delaware
No Drawing. Filed Jan. 11, 1963, Ser. No. 250,767
3 Claims. (Cl. 106—5)

This invention appertains to a latex, a simple process for preparing the latex and products prepared therefrom. More particularly, the present invention pertains to the preparation of an organic, solvent-free, stable, high-solids, collodial suspension of ethylcellulose in water.

The water-borne, ethylcellulose latexes of the present invention are particularly adapted to be employed as the film-forming component (a) in water-based latex paints for interior and exterior application, (b) in floor polish formulations, (c) in shoe polish formulations, and (d) in clear, water-based lacquer finishes. The water-borne, ethylcellulose latexes of the invention also find utility in paper coatings, car polishes and in the formation of colloidal films for use in biological research procedures. In addition, these novel, water-borne, ethylcellulose latexes may be used in many of the applications where organic, solvent, ethylcellulose lacquers are currently used, such as cloth sizing, binders, etc.

It is worthy of note that the water-borne, ethylcellulose latexes of the present invention maintain their suspension stability in the presence of certain component plasticizers which, in some formulations, may be added to assist in the drying of the latex to a continuous film. In like manner, these ethylcellulose latexes remain stable in the presence of certain compatible, organic, polymeric resins that may be incorporation in various paint formulations to provide improved extensibility characteristics to the latex film. Also, these colloidal suspensions of ethylcellulose in water, which we refer to as ethylcellulose latexes, are compatible with certain drying oils which advantageously may be admixed into paint formulations to improve the water-resistance characteristics of the dried latex films.

Synthetic latexes of styrene-butadiene, acrylic resins, vinylidene chloride copolymer resins and various other vinyl aromatic resins have found wide acceptance in the preparation of both interior and exterior water-based paints. One of the difficulties with those latex materials is that their particle size is established during suspension or emulsion polymerization and various aids, such as emulsion stabilizers, surface-active agents and the like, must be added that later on tend to interfere with the spreadability, gloss, durability, soil-resistance, washability, weatherability, adhesion, cohesion and other necessary physical properties of the paint and protective coatings applied therefrom. Further, those deficiencies of the resinous latexes must be compensated for by the incorporation of other additives, such as pigments, thickening agents, film coalescence aids, pigment dispersants, bactericides and the like. Such latexes provide films which are generally rubbery and tacky in the absence of pigment, they dry slowly and they have the troublesome tendency of not cleaning readily from brushes or applicators.

Heretofore, cellulose derivatives have not been used in synthetic latexes, except for water-soluble cellulose ethers, such as methyl cellulose ether, as thickening agents. Admittedly, emulsions of cellulose derivatives have been known for many years. Eberlin and Beal, in U.S. Patent 1,589,328, issued June 15, 1926, described emulsions of cellulose derivatives and coalescing agents therefor. Those emulsions consisted of a lacquer of the cellulose derivatives emulsified with water. Such emulsions often contained flammable and toxic solvents and involved problems of solvent recovery when they were used.

In contradistinction, the ethylcellulose latexes of the present invention are colloidal suspensions of a solid polymer in water. If plasticizing agents are included, their amounts is insufficient to dissolve the ethylcellulose derivative, nor to render it flowable unless at temperatures above the normal and necessary operating conditions. Coatings of the ethylcellulose latexes of the present invention can be applied by flow out, brush spraying or other conventional coating application means, and no solvent other than water is involved.

A principal objective of the present invention is the provision of high-solids, film-forming, solvent-free, ethylcellulose latexes.

Another objective of the invention is the provision of a simple method for preparing such ethylcellulose latexes.

A further objective of the invention is the provision of ethylcellulose latexes (1) which are stable without the incorporation therein of hydrophilic thickening agents; (2) that have outstanding freeze-thaw stability; (3) that provide coatings that are substantially tack-free; and (4) that are more widely compatible with various formulating materials, such as plasticizers, oils, pigment dispersions, emulsified waxes and the like, than are other generally available organic, polymeric latexes.

An additional objective of the invention is the provision of ethylcellulose latexes which can be incorporated with other generally known, organic, polymeric latexes to reduce the unsatisfactory tackiness of applied films of those polymeric latexes.

Another important objective of the invention is the provision of water-borne, ethylcellulose latexes which can be employed as the film-forming component for a wide variety of highly utile protective coating products, such as polishes and waxes (e.g. for wood, linoleum, leather and the like), interior and exterior paints and lacquers, as well as paper and textile coatings, etc.

These and other objectives of the present invention and its various advantageous features have been attained and will become apparent upon consideration of the succeeding description.

Accordingly, the high-solids ethylcellulose latexes of the present invention comprise collodial suspensions of a solid ethylcellulose polymer in a nominal amount of water sufficient to produce an oil-in-water emulsion. In addition, these high solids ethylcellulose latexes usually contain a sufficient amount of a volatile emulsifying agent to keep the pH of the latex suspension mildly alkaline. Optionally, these ethylcellulose latexes may contain a minor amount of certain plasticizing agents, extender and hiding or color pigments, waxes and drying oils.

The high-solids, water-borne, ethylcellulose latexes of the present invention are readily prepared by means of a simple process which comprises (A) the preparation of an oil-in-water emulsion by dispersing a sufficient amount of water in an ethylcellulose lacquer composed of an organic liquid containing ethylcellulose, said lacquer having a non-volatile solids content of up to 35, and preferably up to 50, weight percent; and (B) distilling said oil-in-water emulsion until all of the ethylcellulose lacquer solvent is removed.

Ethylcellulose ether materials that are suitable for employment in the preparation of the ethylcellulose latexes of the present invention include several members of those grades of water-insoluble ethylcellulose flake designated as standard grades having an ethoxyl content per glucose unit of from 48.5 to 49.5 percent and absolute viscosities within the range of from about 10 to about 50 centipoises at 25° C. as determined on a 5.0 weight percent solution of standard ethylcellulose in an 80:20 volume percent toluene:ethyl alcohol solvent. Also, included in the preferred group of operable ethylcellulose ether materials are several members of those grades of ethylcellulose flake designated as medium grades having an ethoxyl content per glucose unit of from 45.0 to 46.5 percent and absolute viscosities within the range of from about 10 to about 50 centipoises at 25° C. as determined on a 5.0 weight percent solution of medium ethylcellulose in a 60:40 volume percent toluene:ethyl alcohol solvent. Further operable ethylcellulose ether materials that can be used for present purposes are intermediate stage products of most commercial processes making standard ethoxyl and medium ethoxyl grade of ethyl cellulose. These intermediate products or midway products of the processes are wet ethylcellulose slurries containing about 60 percent water. Such aqueous ethylcellulose slurries, from midway in the ethylcellulose ether production processes, may be used but only if the sodium chloride concentration of the slurry is low. Unlike other cellulose ether derivative products, the use of water wet polymer, that has not previously been dried, to prepare any type of useful product, and particularly ethylcellulose ether latexes, is unique. Further, it is well to note, that in the preparation of the novel high-solids ethylcellulose latexes of the invention, the medium ethoxyl grades of ethylcellulose ether, as characterized above, contribute to the preparation of a better oil-in-water emulsion. However, better film-forming ethylcellulose latexes are generally produced from standard ethoxyl grades of ethylcellulose ether, as also characterized above.

The ethylcellulose ether raw materials of use in the latexes of the invention are products of the interaction of ethyl chloride with alkali cellulose. Processes for producing these materials are well known in the art and references covering various details of these processes are ably summarized in "Cellulose and Cellulose Derivatives," Part II, edited by Emil Ott, Harold M. Spurlin and Mildred W. Grafflin, 2nd edition, 1954, Interscience Publishers, Inc., New York. Chapter IX supra entitled "Derivatives of Cellulose" by A. B. Savage, A. E. Young and A. T. Maasberg covers the art in the preparation of ethylcellulose on pages 913 through 928.

The incorporation of certain plasticizing agents provides the ethylcellulose latexes of the invention with stability to repeated freezing and thawing cycles, when stored, as well as assisting in the formation of a continuous film of applied coating formulations of these ethylcellulose latexes. The amount of plasticizer which is suitable for incorporation into the water-borne latexes of the invention can vary from zero to about 50 weight percent or more, as based on the weight of ethylcellulose employed. Although various other plasticizing agents may later be found to perform effectively with the instant ethylcellulose latexes by persons skilled in the art who become aware of the utility of these novel latexes, representative operable members of various classes of plasticizers are listed hereinafter. However, the employment of these plasticizers is exemplary and is not to be construed as limiting to the present invention. Plasticizers of the types, such as triethanolamine; trischloroethyl phosphate; the adduct of 2 moles of propylene oxide and 1 mole of 4,4'-isopropylidene diphenol; a mixture of ortho- and para-toluene ethylsulfonamides, having a free amide content of 9-13 percent, 0.1 percent maximum acidity and 0.21 percent solubility in water at 48° C. and obtained as "Santicizer 8"; and the like, can be incorporated in the instant ethylcellulose latexes at ambient temperatures to assist in the formation of a highly satisfactory continuous film of applied coatings of these latexes.

Other suitably operable types of plasticizers that can be effectively incorporated in the latexes of the invention at moderately elevated temperatures to assure the provision of continuous films of the novel latexes include butyl phthalyl butyl glycollate, methyl phthalyl methyl glycollate, acetyl triethyl citrate, acetyl tributyl citrate, acetyl trioctyl citrate and the like. Additional plasticizers that may be substituted as a part of the foregoing types of plasticizers, but that do not yield continuous, ethylcellulose, latex-based coatings films, if employed as the only plasticizer component, include: the diphenyl phosphate ester of o-phenylphenol; p,p'-di-tert.-octyl diphenyl oxide; poly α-methylstyrene; tri-n-octyl aconitate; butyl phthalyl ethyl glycollate; and an alkyl aryl phosphate, obtained as "Santicizer 141."

The only emulsifying agent required in the ethylcellulose latexes of the invention is ammonia which is added to the formulated latex composition in a sufficient amount to keep the pH thereof mildly alkaline, e.g. within the range of from at least 8.5 to about 9.0 Ultimately, the ammonia component of the instant latex compositions is lost on drying through volatilization. In circumstances where loss of the ammonia emulsifier during storage may cause difficulty, a small amount of up to about 1.0 weight percent of potassium oleate or of 2-amino-2-methyl-1-propanol can be added to supplement from 0.005 to about 5.0 weight percent of the ammonia. A common and satisfactory way of incorporating the necessary amount of ammonia emulsifier in the latexes of the invention is accomplished by the addition of an aqueous ammonium hydroxide solution containing about 28 weight percent ammonia.

A wide variety of water-dispersible color and extender pigments can be employed with the novel, water-borne, ethylcellulose latexes of the present invention. The pigments employed, however, must be stable and non-reactive under alkaline conditions, i.e. a pH over 8. The consistency of the pigmented ethylcellulose latex compositions is controlled by the water-absorption of the pigment components, which if unsatisfied, will remove water from the instant ethylcellulose latex component in which it is dispersed. Typical large particle size extender pigments which are suitable include calcium carbonate, barytes, clays, lithopone, mica, talc, diatomaceous silica and particularly large particle size, water-dispersible grades of titanium dioxide. The coloring and tinting pigments normally used in other latex-based paint formulations are also generally satisfactory in paint formulations of the novel, water-borne, ethylcellulose latexes of the present invention. These color pigments include the following: naphthol red, phthalocyanine green, carbon black, red iron oxide, burnt umber, cadmium yellow, burnt sienna, ultamarine blue, cadmium red, cadmium orange, hydrated chromium oxide and the like.

Pigment dispersants in small amounts are ordinarily used in most latex coating formulations and are helpful in the formulation of some of the ethylcellulose, latex-based coatings of the present invention. Certain dispersing agents, such as potassium tripolyphosphate, the sodium salt of technical lauryl alcohol sulfate, obtained as "Duponol ME" and the sodium salt of a carboxylated polyelectrolyte, obtained as "Tamol 731," are efficient dispersants suited to the instant use. Other common dispersants may be employed which would provide equivalent performance.

The wax materials that are preferably employed in formulating latex/wax paints, based on the water-borne, ethylcellulose latexes of the present invention, are aromatic based waxes obtained from California crude oil including softer paraffin waxes, such as slack wax, sweat wax; and intermediate paraffin waxes, such as special refined scale wax, white scale wax, yellow scale wax, obtained as "Sunoco Wax 1290," fully refined scale wax and the like. Softer natural waxes, such as ceresin, can likewise be employed to advantage in the ethylcellulose latex/wax paint formulations of the invention. Carnauba wax is the preferred hard wax for incorporating into the floor and shoe polishes of the invention based on the new water-borne ethylcellulose latexes. However, the carnauba wax content can be reduced by the use of the other natural waxes, such as candelilla, ouricury, sugarcane, esparto, etc., as extender waxes. Other semihard waxes of natural origin may be used to supplement the carnauba wax requirement in any given formulation. These natural semihard waxes include beeswax, montan, hard ceresin, oxidized microcrystalline wax and the like. Other natural and synthetically prepared waxes of value for present purposes will be known to persons skilled in the art of preparing wax-containing compositions. These waxes are also contemplated within the scope of the wax-containing compositions of the present invention.

Among the drying oils that optionally may be employed in the preparation of the outstandingly superior, water-borne, ethylcellulose latex lacquers and paints of the present invention are dehydrated castor oil, tung oil, china wood oil, safflower oil, long oil linseed alkyd, long oil soybean alkyd, raw linseed oil, and particularly boiled linseed oil. However, other types of oils wherein the polymer is insoluble but compatible therewith and which are compatible with the formulated latex coatings and which migrate out of the coalesced latex film may be used. For best results, from about 10 to about 25 weight percent and preferably from about 10 to about 20 weight percent of the total combined weight of waxes and drying oil, based on the total wet weight of the formulated ethylcellulose latex coating, may be used.

Some drying oils are supplied by the manufacturer with a sufficient amount of an oil drier, e.g. cobalt naphthenate, naphthenate drier compositions composed of a mixture of lead-, manganese- and cobalt naphthenate, lead acetate, zinc resinate and the like, incorporated therein. These drier-containing drying oils are suitable for use in the paints and varnishes of the present invention depending upon the finish desired. Likewise, other drying oils and long oil alkyds to which a drier is added at the time of use also give similarly good results.

To increase the effectiveness of the water-borne, ethylcellulose latex coatings of the present invention, the drying oil may be added to the formulated latex by easily and simply admixing or stirring into the latex formulation by hand-paddle mixing or mechanically stirring in the indicated amount of a drying oil. The drying oil normally remains suspended for several hours in the latex formulation without requiring further agitation to provide an excellent latex composition.

The ethylcellulose lacquer, used as a starting material in the preparation of the novel, water-borne, ethylcellulose latexes of the invention, can be prepared at any convenient temperature and pressure. For example, the lacquer can be prepared at from room temperature to about 50° C. or higher.

The wet ethylcellulose intermediate product, as described heretofore, may likewise be employed to prepare the ethylcellulose lacquer starting material. The lacquer should not contain over 50 weight percent of ethylcellulose solids or it will be too viscous to distill conveniently later in the process of producing the novel, water-borne, ethylcellulose latex of the invention. To prevent the separation of the ethycellulose from the aqueous latex, it is frequently advisable to keep the ethylcellulose content of the distilling lacquer at about 35 weight percent of ethylcellulose solids. In the event that ethylcellulose of a higher viscosity grade is employed to make the lacquer starting material, it is advisable to reduce the concentration of lacquer solids below 35 weight percent of ethylcellulose.

The number of organic liquids capable of dissolving ethylcellulose to prepare lacquers is large, but practical considerations greatly reduce the number that are acceptable for general use. The solubility of standard and medium ethoxyl ethylcellulose, as described heretofore, may be summarized by solvent types as follows:

Standard-ethoxyl ethylcellulose dissolves completely to yield clear solutions in all solvents except naphthas, purely aliphatic hydrocarbons, polyhydric alcohols and a few ethers. Thus, standard-ethoxyl ethylcellulose lacquers can be produced using aromatic hydrocarbons, such as benzene, toluene, xylene, ethyl benzene, isopropyl benzene; cyclohexene; dipentene; chloroform, carbon tetrachloride, ethylene dichloride, trichloroethylene and other chlorinated aliphatic hydrocarbons; monochlor-, o-dichlor- and trichlorbenzenes; $C_1$ to $C_{18}$ monohydric aliphatic alcohols; monohydric cyclic alcohols, e.g. furfuryl alcohol, methyl cyclohexanol, benzyl alcohol, phenyl ethyl alcohol and the like; ether alcohols including ethylene glycol monoethyl ether, ethylene glycol monomethyl ether, ethylene glycol monobutyl ether and diethylene glycol monobutyl ether; ethers, such as dioxane, morpholine and ethylene glycol diethyl ether; esters of acetic acid, such as $C_1$ to $C_6$ alkyl esters of acetic acid, cyclohexyl acetate, glycol diacetate, 2-ethoxy ethyl acetate, ethoxy diglycol acetate and butoxy diglycol acetate; esters of hydroxy acids, such as $C_2$ to $C_4$ alkyl esters of lactic acid and methyl salicylate; and ketones, such as acetone, methyl ethyl ketone, mesityl oxide, diacetone alcohol, cyclohexanone, acetophenone, and the like. In addition to the above suitable solvents for standard ethoxyl ethylcellulose, various compatible mixtures of these solvents may and are frequently advantageously employed.

Medium-ethoxyl ethylcellulose yields clear solutions in relatively few single solvents. These include cyclohexene, methyl acetate, dioxane, butyl lactate and most chlorinated aliphatic hydrocarbons, representative members of this group being set forth in the preceding paragraph. However, medium-ethoxyl ethylcellulose dissolves readily in mixtures of aromatic hydrocarbons with ethanol or butanol as shown hereinafter in the working examples.

Following the preparation of an ethylcellulose lacquer of suitable concentration, the next operation in the process for producing water-borne, ethylcellulose latexes is the preparation of an oil-in-water emulsion of the lacquer in water. While the lacquer is being stirred at room temperature in a suitably equipped receptacle, water containing a very minor amount of ammonium hydroxide is added dropwise to the moving lacquer. The emulsification procedure is reversible. Accordingly, it is possible to add water and lacquer back and forth until the desired oil-in-water emulsion is obtained. The water component of the oil-in-water emulsion is preferably maintained at about room temperature to retain the ammonia from the ammonium hydroxide solution therein. If the water temperature exceeds 50° C., the ammonia volatilizes The final operation in the process for producing the novel, water-borne, ethylcellulose latexes of the present invention involves removing the lacquer solvent from the oil-in-water emulsion of lacquer and water. This operation is satisfactorily performed by means of distillation. The distillation can be conducted in any convenient manner known to remove volatile organic solvents. However, steam distillation is the preferred method and distillation accomplished with dry steam tends to reduce the amount of water added to the latex. Thus. distillation is continued until all traces of solvent have been removed from the oil-in-water emulsion. The temperature range in which distillation occurs is determined by the vaporization temperature range of the solvent or solvent system employed to prepare the ethylcellulose lacquer starting material. Accompanying pressures employed during the distillation may be varied as desired from subatmospheric to superatmospheric in accordance with the requirements of the equipment employed.

The novel, water-borne, ethylcellulose latexes produced by means of the above-described process generally vary from thin to viscous colloidal suspensions, depending upon the solids content of the latex. These useful aqueous latex suspensions are characterized by having a bluish color. Further, they usually have a pH within the range of from at least 8.5 to about 9.0 and a density of from 1.0 to 1.1 gram per milliliter.

Paints containing the ethylcellulose latexes of the present invention as the principal coating composition vehicles are commonly viscous, semi-dry material. These paints are thixotropic in character and, accordingly, spread or brush out readily. These paints, like unto the ethylcellulose latex contained therein, also posses a bluish tinge. Advantageously, they dry rapidly at room temperature in from 15 to 40 minutes and are found to be water resistant within a few minutes of application time.

The following are more specific illustrative examples of the preparation of the water-borne, ethylcellulose latexes of the present invention and various useful paint and polish formulations employing the novel latexes as the major constituent.

EXAMPLE I

Ethyl cellulose latex

| Ingredients: | G. |
|---|---|
| Ethylcellulose, standard ethoxyl grade [1] | 480.0 |
| 60:40 vol. percent benzene:2B ethyl alcohol mixture [2] | 751.0 |
| Aqueous ammonium hydroxide (28% $NH_3$) | 32.4 |
| Potassium oleate | 3.6 |
| Water | 600.0 |

[1] Having an ethoxyl content of from 48.5 to 49.5 percent and a viscosity of 10 cps. as a 5 weight percent solution in an 80:20 volume percent mixture of toluene and ethyl alcohol at 25° C.

[2] 2B ethanol, a denatured alcohol formulation containing 0.5 gallon of benzene per 100 gallons of 190 proof ethanol.

A lacquer was prepared by dissolving the ethylcellulose and the potassium oleate in the benzene-ethyl alcohol solvent using a wire stirring device in a Mason quart jar. The ammonium hydroxide was added to the water and the alkaline water was added dropwise from a burette to the stirred lacquer. The water-in-oil emulsion became thickened to the point of inversion. Thereafter, the addition of more water thinned the oil-in-water emulsion.

Subsequently, the oil-in-water emulsion was transferred to a paddle agitated, four-liter, glass reaction vessel equipped with a discharge condenser and a steam inlet below the liquid. The emulsion was stirred only enough to present lumping and was heated to boiling (64° C.) by an electric mantle fitted about the exterior of the reaction vessel. When solvent had begun to distill off, dry steam was admitted directly and steam distillation was continued until the distillate coming off was water and the temperature of the vapor phase of the reaction was at least 96° C. Distillation was discontinued and the solvent-free emulsion was poured into a Mason jar to cool. Any surface skin which formed on cooling of the emulsion redispersed upon gentle mixing. The yield weight of the solvent-free latex emulsion, thus obtained, varied from 1200 to 1500 grams, depending upon the amount of water distilled before the steam was introduced and upon the dryness of the steam. The benzene-ethyl alcohol solvent removed by distillation could be reused, without redistillation, in the preparation of another batch of ethylcellulose latex.

EXAMPLE II

Plasticized ethylcellulose latex

| Ingredients: | G. |
|---|---|
| Ethylcellulose, medium ethoxyl grade [3] | 480.0 |
| Adduct of 2:1 mole ratio of propylene oxide and 4,4'-isopropylidene diphenol | 200.0 |
| Aqueous ammonium hydroxide (28% $NH_3$) | 32.4 |
| 60:40 vol. percent benzene:2B ethanol mixture (Ex. I, Note 2) | 751.0 |
| Water | 600.0 |

[3] Having an ethoxyl content of from 45.0 to 46.5 percent and a viscosity of 10 cps. as a 5 weight percent solution in an 80:20 volume percent mixture of toluene and 2B ethyl alcohol at 25° C.

The procedure of Example I was employed, however, the adduct plasticizer was incorporated in the lacquer before the lacquer was emulsified.

EXAMPLE III

Plasticized ethylcellulose latex

| Ingredients: | G. |
|---|---|
| Ethylcellulose, medium ethoxyl grade (Ex. II, Note 3) | 240.0 |
| Mixture of o- and p-toluene ethylsulfonamides [4] | 60.0 |
| Adduct of 2:1 mole ratio of propylene oxide and 4,4'-isopropylidene diphenol | 45.0 |
| Potassium oleate | 1.0 |
| Aqueous ammonium hydroxide (28% $NH_3$) | 18.0 |
| 60:40 vol. percent benzene:2B ethyl alcohol (Ex. I, Note 2) | 375.0 |
| Water | 300.0 |

[4] Obtained commercially as "Santicizer 8" having a free amide content of 9–13 percent, 0.1 percent maximum acidity and 0.21 percent solubility in water at 48° C.

The above recipe was formulated in accordance with procedures set forth in Example II. The yield of the solvent-free latex emulsion product was 738 grams.

Attention is called to the fact that alternatively, if desirable, the plasticizing agents, "Santicizer 8" and the above-described adduct, may be stirred into the completed latex.

EXAMPLE IV

Plasticized ethyl cellulose latex film

The latex of Example III was cast on a glass plate. It dried at room temperature to form a continuous adherent film. The film could be removed by lubricating the glass plate with a silicone grease prior to casting of the latex. The dried latex film, thus provided, was observed to be strong and self-supporting.

EXAMPLE V

Ethylcellulose latex-based floor polish

| Ingredients: | Wt. percent |
|---|---|
| Part A.—Ethylcellulose composition: | |
| Ethylcellulose, standard ethoxyl grade (Ex. I, Note 1) | 32.3 |
| Water | 66.8 |
| Ammonia | 0.7 |
| Potassium oleate | 0.2 |
| Part B.—Wax emulsion: | |
| Carnauba wax | 18.7 |
| Oleic acid | 1.8 |
| Triethanolamine | 3.1 |
| Borax | 1.2 |
| Water | 75.2 |

Part B was prepared by melting together all ingredients but the water and subsequently adding the water, dropwise, into the stirred melt. Then, into an admixture of 250 grams of Part A and the sulfonamides, obtained as "Santicizer 8," were stirred 250 grams of Part B. The product was a smooth, dirt-resistant floor polish, an application of which gave satisfactory performance on white vinyl linoleum for over a month.

EXAMPLE VI

Ethylcellulose latex-based shoe polish

| Ingredients: | Wt. percent |
|---|---|
| Part A: | |
| Beeswax | 18.7 |
| Oleic acid | 1.8 |
| Triethanolamine | 3.2 |
| Borax | 1.5 |
| Water | 74.8 |
| Part B: | |
| Carnauba wax | 18.7 |
| Oleic acid | 1.8 |
| Triethanolamine | 3.1 |
| Borax | 1.2 |
| Water | 75.0 |

Ingredients:—Continued  Wt. percent
Part C.—Ethylcellulose latex composition:
    Ethylcellulose, standard ethoxyl
        grade (Ex. I, Note 1) _____ 32.3
    Water _____ 66.8
    Ammonia _____ 0.7
    Potassium oleate _____ 0.2

Into 100 parts of Part C were admixed 17 parts of "Santicizer 8," as defined theretofore. Subsequently, 150 parts of Part A and 75 parts of Part B were admixed with plasticized Part C. The resultant product, a shoe polish, was observed to be highly scuff resistant when a dried film of the same on leather was tested by scuffing with various types of abrasives.

EXAMPLE VII

*Ethylcellulose latex-based paint*

Ingredients:  Wt. percent
Part A.—Ethylcellulose latex composition:
    Ethylcellulose, medium ethoxyl
        grade (Ex. II, Note 3) _____ 31.1
    Water _____ 54.5
    Adduct of 2:1 mole ratio of propylene
        oxide and 4,4′-isopropylidene diphenol 13.6
    Potassium oleate _____ 0.1
    Ammonia _____ 0.6

Part B:  Wt. g.
    Titanium dioxide [5] _____ 24.0
    Mica _____ 5.0
    Calcium carbonate _____ 2.0
    China clay _____ 2.0
    Polypropylene glycol (ave. mol. wt. 1200) 0.5
    "Duponol ME" [6] _____ 0.2
    Water _____ 16.5

[5] Titanium dioxide, obtained as "Titanox Ti Pure R300" having a specific gravity of 3.88, an index of refraction of 2.52 and a pH value of from 7.0 to 7.3.
[6] Sodium salt of technical lauryl alcohol sulfate, obtained as "Duponol ME."

To prepare Part B, the wetting agents were dissolved in the water and this solution was in turn admixed with the titanium dioxide, so that the pigment was thoroughly wetted. The mica, calcium carbonate, and china clay were then mixed in. Subsequently, Part B, thus prepared, was admixed with 155 parts of Part A. The resultant product was a white latex paint. The consistency of the paint was substantially semi-solid, but it was thixotropic in character and, accordingly, spread smoothly when brushed on. Two applications were brushed onto an unsanded, unprimed pine panel allowing a drying period of about 40 minutes for the first coat. As soon as the paint was dry to the touch, the panel was exposed facing south at a 45 degree angle to the vertical on the roof of a two-story building. After 13 months' exposure in a chemical-laden industrial atmosphere to an average temperature of 80° F. and frequent rains, the coating remained hard, continuous and adherent.

EXAMPLE VIII

*Ethylcellulose latex/acrylic latex composition*

Ingredients:
Part A:  Wt. percent
    Ethylcellulose, standard ethoxyl grade
        (Ex. I, Note 1) _____ 32.5
    Adduct of 2:1 mole ratio of propylene oxide and 4,4′-isopropylidene diphenol __ 14.2
    Potassium oleate _____ 0.13
    Ammonia _____ 0.74
    Water _____ 52.43

Part B:  Wt. g.
    Titanium dioxide (Ex. VII, Note 5) ___ 240.0
    Mica _____ 50.0
    Calcium carbonate _____ 20.0
    China clay _____ 20.0
    Polypropylene glycol (ave. mol. wt. 1200) 5.0
    Potassium tripolyphosphate _____ 2.0
    Water _____ 350.0

Part B, prepared according to procedure set forth in Example VII, was admixed with 450 grams of Part A and 50 grams of an aqueous dispersion containing about 47 percent of non-volatile solids of a quaternary interpolymer latex composed of about 66 weight percent of copolymerized ethyl acrylate, about 32 weight percent of copolymerized methyl methacrylate, about 1.0 weight percent of copolymerized acrylic acid and about 1.0 weight percent of copolymerized methacrylic acid. The resultant paint was semi-solid in consistency but thixotropic. A coating of this ethylcellulose/acrylic latex paint on a pine panel, prepared in accordance with the procedure described in Example VII, was observed to be unchanged after 13 months of out-door exposure.

EXAMPLE IX

*Ethylcellulose latex/wax paint*

Ingredients:
Part A:  Wt. percent
    Ethylcellulose, medium ethoxyl grade (Ex.
        II, Note 3) _____ 37.1
    Water _____ 61.9
    Potassium oleate _____ 0.2
    Ammonia _____ 0.8

Part B:  Wt. g.
    Part A _____ 50.0
    Mixture of o- and p-toluene ethylsulfonamides (Ex. III, Note 4) _____ 8.0
    Titanium dioxide (Ex. VII, Note 5) ____ 24.0
    Mica _____ 5.0
    Calcium carbonate _____ 2.0
    China clay _____ 2.0
    Polypropylene glycol (ave. mol. wt. 1200) 0.5
    Potassium tripolyphosphate _____ 0.2

Part C:  Wt. percent
    Yellow scale wax [7] _____ 22.0
    Sodium stearate _____ 1.0
    Glyceryl monostearate _____ 2.0
    Water _____ 75.0

Part D:
    Ethylcellulose, standard ethoxy grade (Ex.
        I, Note 1) _____ 31.1
    Adduct of 2:1 mole ratio of propylene oxide and 4,4′-isopropylidene diphenol ___ 13.6
    Potassium oleate _____ 0.1
    Aqueous ammonium hydroxide (28% NH$_3$) _ 0.6
    Water _____ 54.5

Part E:
    Equal parts of the immediately preceding Part C and Part D were mixed.

[7] Obtained as "Sunoco Wax 1290 yellow."

Subsequently, equal parts of the foregoing Part B and Part E were mixed. The instant product was a viscous, wax-containing, ethylcellulose latex paint. A pine panel, unsanded and unprimed, was brush coated with this paint, in the manner previously described. It was observed that the wax did not interfere with the rapid drying of the coating. The coating remained hard and continuous after 13 months of exposure to weather under atmospheric conditions described supra. The coating possessed a waxy, water-repellent surface on which, it was observed, water stood as droplets.

EXAMPLE X

Nine parts of the paint of Example VII were admixed with one part of boiled linseed oil. A panel, coated as described previously, retained a hard and continuous coating after 13 months of exposure to extremely varied weather conditions.

EXAMPLE XI

Paints of Examples VII, VIII, IX and X have remained white in the chemical, vapor-laden atmosphere of the laboratory for more than one year during exposure to hydrogen chloride, ammonia and other organic chemical vapors. A laboratory beaker and bottle drying rack coated with the paint of Example VII was ready for use when dry to the touch and has maintained its original quality of finish in spite of contact of soap and detergents for many months.

A limited number of examples of the preparation of the water-borne, ethylcellulose latexes of the invention, as well as examples of floor and shoe polishes and interior and exterior paints baked thereon, are described above to illustrate ethylcellulose latex and formulated latex-based products of the invention. It will be apparent that many different modifications and equivalents may be made without departing from the spirit and scope of the described invention and, therefore, the invention is intended not to be limited except as defined by the appended claims.

What is claimed is:

1. Water-borne, ethylcellulose, latex-based polish composition comprising a homogeneous blend of (I) an aqueous colloidal suspension of solid polymer composed of from 30 to 35 weight percent of ethylcellulose ether latex solids having an ethoxyl content per glucose unit of from 48.5 to 49.5 percent containing at least one emulsifying agent in amount sufficient to maintain the pH of said latex of from at least 8.5 to about 9, the total weight of said aqueous colloidal suspension being equal to 100 weight percent; and (II) at least one aqueous wax emulsion composed essentially of a wax material selected from the group consisting of a hard wax and a semihard wax, the total weight of said aqueous wax emulsion being equal to 100 weight percent, said blend containing from about 1 part of I to from about 1 to about 2.25 parts of II.

2. A floor polish of the composition of claim 1, wherein said aqueous wax emulsion is an 18.7 weight percent aqueous carnauba wax emulsion, said wax emulsion and said ethylcellulose latex dispersion being combined in equal parts.

3. A shoe polish of the composition of claim 1, wherein said aqueous wax emulsion is a mixture of (A) an 18.7 weight percent aqueous carnauba wax emulsion and (B) an aqueous beeswax emulsion, said A, B and said ethylcellulose latex dispersion being present in the ratio of 1.5:0.75:1 parts, respectively.

References Cited

UNITED STATES PATENTS

| | | | |
|---|---|---|---|
| 2,345,879 | 4/1944 | Moore | 106—170 |
| 2,388,613 | 11/1945 | Keller | 106—170 |
| 2,561,816 | 7/1951 | Pabst et al. | 106—191 |
| 2,843,583 | 7/1958 | Voris | 106—170 |
| 2,947,645 | 8/1960 | Milne | 106—170 |
| 2,964,417 | 12/1960 | Ward | 106—170 |

ALEXANDER H. BRODMERKEL, *Primary Examiner.*

ALFRED L. LEAVITT, *Examiner.*

L. HAYES, *Assistant Examiner.*